Jan. 18, 1944.     A. MENDEL     2,339,283
THIN RUBBER GOODS
Filed Nov. 1, 1941     2 Sheets-Sheet 1

INVENTOR.
Alfred Mendel
BY Frederick E. Hahn

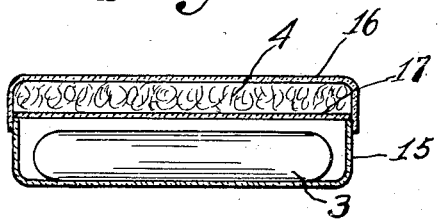
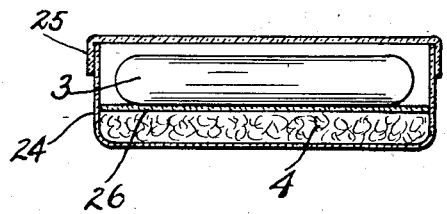
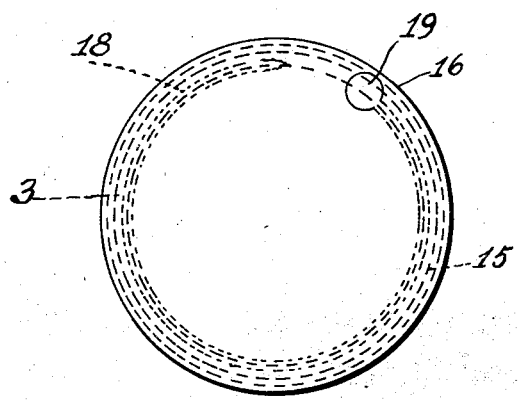
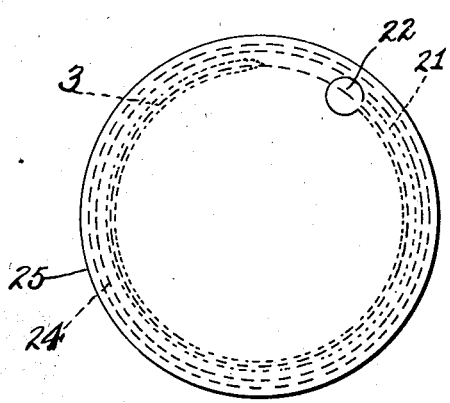
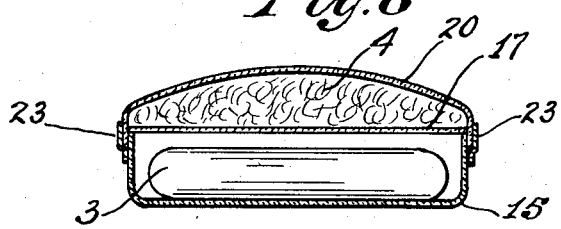
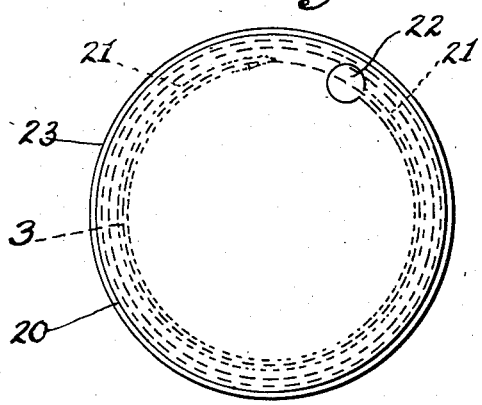

Patented Jan. 18, 1944

2,339,283

UNITED STATES PATENT OFFICE 2,339,283

THIN RUBBER GOODS

Alfred Mendel, New York, N. Y.

Application November 1, 1941, Serial No. 417,444

4 Claims. (Cl. 206—63.2)

My invention relates to articles manufactured by what is commonly known as the dipping process. It may be used for various articles composed of any suitable material of a congealable liquid form or capable of being reduced to a solution and deposited on a form.

My invention relates particularly to surgical devices as finger-cots, nipples, rubber gloves, finger-stalls, prophylactics, catheters, sheaths or the like, made from a liquid latex compound or rubber cement or any other suitable material.

The surface of rubber and related material usually used for such articles offers a comparatively high resistance to an introduction into a body opening. Such resistance entails the danger of irritation of body tissues and of damage to the introduced finger-stall or the like since the material used for such articles is very thin and sensitive. Various suggestions have been made to secure a smooth sliding effect. For instance it is known to treat the surface of the article with substances which quickly swell if brought in contact with moisture and make the surface of the rubber or so like slippery. However, the use of such quick swelling substances has the disadvantage that the surface becomes slippery only when sufficient moisture is present and after the surface has been brought into contact with it. Consequently, the resistance applied to an introduction is not reduced by the use of such swelling substances at the moment of penetration.

An object of my invention is to provide a lubricant for making the surface of surgical devices such as finger-cots, prophylactics and the like slippery before introduction into a body opening without requiring a preceding contact with moisture and to protect such lubricant by a sanitary cover which can be easily removed partly or entirely when the article is to be used.

Another object of my invention is to combine surgical devices such as finger-stalls, prophylactics and the like and a lubricant for making the surface of these articles slippery before introduction into a body opening into a unit by enclosing the lubricant and the articles into a common container. In this container I separate said lubricant and said articles by an easily removable partition sheet which protects said lubricant against any unsanitary contact until the lubricant is to be used. I provide the lubricant either on the bottom or at the top of said container.

Another object of my invention is to combine at least one surgical device such as a finger-stall, prophylactic and the like, with a composition composed of a lubricant for making a rubber surface slippery and a germicidal agent into a unit ready for use.

Other objects of my invention will be hereinafter set forth and the novel features thereof defined by the appended claims.

In the accompanying drawings several embodiments of my invention are shown.

Fig. 6 shows a longitudinal section of a third embodiment of a unit according to my invention in which lubricant and article are separated.

Fig. 7 is a plan view of Fig. 6.

Fig. 8 shows a longitudinal section of a modified embodiment.

Fig. 9 is a plan view of Fig. 8.

Fig. 10 shows a longitudinal section of a fourth embodiment of a unit according to my invention in which article and lubricant are separated.

Fig. 11 is a plan view of Fig. 10.

Figure 1:
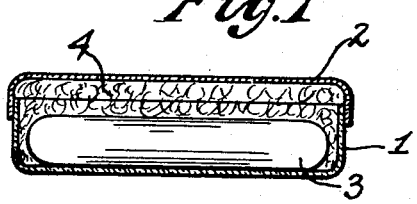
Fig. 1 shows a longitudinal section of a unit according to my invention containing at least one finger-stall and a lubricant.

In Fig. 1, a container or box comprising a bottom 1 and top 2 are provided. The container may be made of metal, cardboard, plastic, or any other suitable material. One or more articles 3, for instance, prophylactics made of rubber are placed in this container, the remaining space is at least partly filled with a lubricant 4 for making the surface of the article slippery. Such lubricant must be one which has no deleterious effect upon rubber and does not irritate body tissues with which it may come in contact. Furthermore, it shall be stable enough to be preserved for a sufficient length of time; various substances of this kind are known to the art. I have found that a very preferable one is petroleum jelly, as known under the trade name "vaseline." However, various other substances may be used, for instance, neutral fats or glycerine. It is also possible to use dry greasy substances for instance, talc. Furthermore, antiseptic or germicidal agents can be added.

Figure 2:
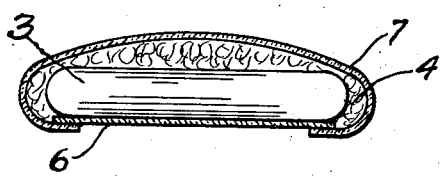
Fig. 2 shows a longitudinal section of a second embodiment of a unit according to my invention.
Figure 3:
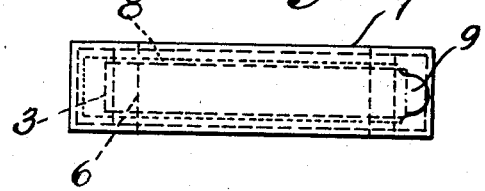
Fig. 3 is a plan view of Fig. 2.

Figs. 2 and 3 show a unit in which the container comprises a bottom plate on which article 3 is placed. The article is well covered with lubricant 4. Article 3 and lubricant 4 are protected by a cover 7 which is attached to bottom 6 by any suitable means, for instance, by glueing.

Cover and bottom are preferably made of transparent sanitary material as, for instance, known under the trade name "Cellophane." In order to facilitate the opening of cover 7 the cover may be weakened along lines 8, 8 and a tongue 9 may be provided by the pulling of which cover 7 is ripped open along weakened lines 8—8. It is preferable to arrange the weakened lines in such a manner that practically the entire cover is removed.

Figure 4:
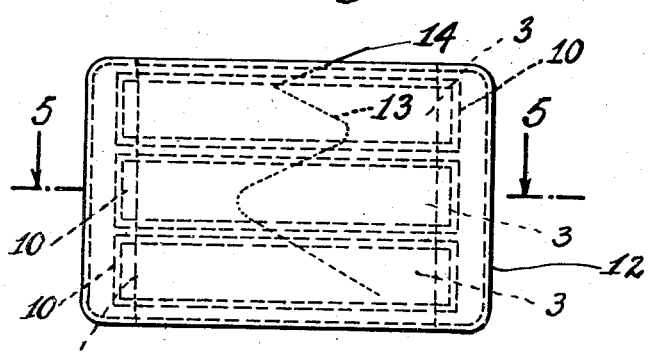
Fig. 4 shows a unit according to my invention in which several articles are united with a lubricant.
Figure 5:
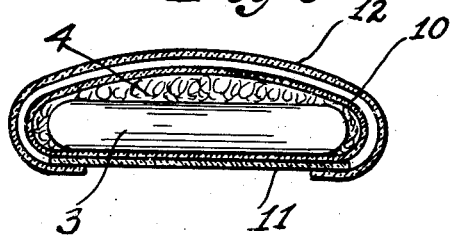
Fig. 5 shows a section along line 5—5 of Fig. 4.

Figs. 4 and 5 show an embodiment in which each article 3 and a sufficient supply of lubricant 4 are enclosed in a container 10 which may be made of any suitable material for instance, Cellophane. Weakened lines and a tongue as described in connection with Figs. 2 and 3 may be provided in order to facilitate the opening of container 10. Several articles 3 with their individual containers for instance, three, are placed on a bottom plate 11 which may consist of cardboard. A cover 12 made of transparent material, for instance Cellophane, or of any other suitable material, serves as a common wrapping for all three articles. Cover 12 can be attached to bottom 11 by any suitable means, for instance by a solution of rubber and alcohol. In order to facilitate the removal of cover 12 a thread 13 may be imbedded into cover 12. Thread 13 may be imbedded in a straight line, a zig-zag line or a meander line. If the protruding end 14 of this thread is pulled it will cut through cover 12, thus laying open the individual containers. It is preferable to arrange the thread in such a manner that practically the entire cover is torn off.

According to Figs. 6 and 7 a container comprising a bottom 15 and a top 16 are provided. One or more articles 3 are placed on bottom 15. Top 16 is used for the supply of lubricant 4. In order to protect the lubricant against any unsanitary contact before actual use, lubricant 4 is covered with a sheet 17. This cover sheet may consist of any suitable material, preferably of a transparent material, for instance Cellophane, and is secured to top 16 by any suitable glue. Opening of cover 17 can be facilitated by weakening cover 17 along lines 18 and by providing a tongue 19 by the pulling of which cover 17 is torn open along weakened lines 18.

The unit shown in Figs. 8 and 9 is similar to the one shown in Figs. 6 and 7 however, the top 20 is rounded or vaulted to facilitate the removal of lubricant 4 placed within top 20. In order to facilitate the opening of cover 17, weakened lines may be used or a thread 21 which is imbedded into cover 17. By pulling the protruding end 22 of this thread cover 17 can be easily torn open or completely removed. Cover 20 and bottom 15 are held together by a strip or ribbon 23 which overlaps the edges of cover and bottom and forms an airtight seal for the container. If the container is to be opened, strip 23 is torn off.

Figs. 10 and 11 show a unit comprising a bottom 24 and a top 25. A sufficient supply of lubricant 4 is placed on bottom 24 and covered with a film 26. This film may be made of any suitable material preferably a transparent one and protects lubricant 4 against any unsanitary contact. Article 3 is placed on film 26. Cover and bottom may be held together by any suitable means, for instance by screwing or a ribbon 23. Weakened lines or an imbedded thread may be provided to facilitate the removal or bursting of film 26. Instead of a flat bottom 24 a rounded bottom can be used as shown in Fig. 8 for the top.

Figure 12:
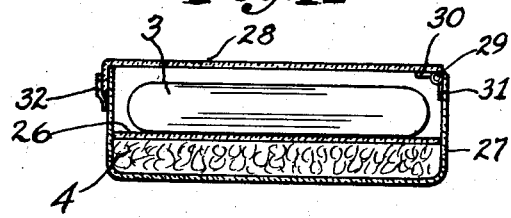
Fig. 12 shows a cross-section of a fifth embodiment of a unit according to my invention.
Figure 13:
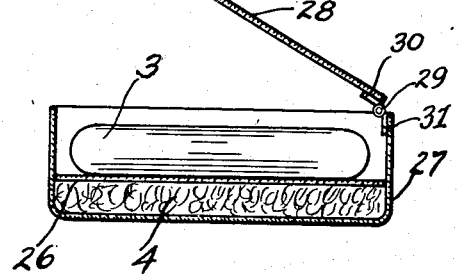
Fig. 13 shows the unit according to Fig. 12 in opened condition.

Figs. 12 and 13 show a unit comprising a bottom 27 and a top 28. Lubricant 4 is placed on bottom 27 and protected by a film or cover 26 which is secured to the walls of the bottom part by any suitable means. The article itself is placed on film or cover 26. Bottom and top are held together by a spring operated hinge 29. The two elastic arms 30 and 31 of this hinge are attached to bottom and top, respectively. Hinge 29 tends to press top 28 into an open position shown in Fig. 13. A ribbon or strip 32 overlapping the edges of bottom 27 and top 28 is provided for holding the container in its closed position against the action of spring hinge 29. Instead of a strip or ribbon 32 a complete wrapping for the container can be used or any other means for holding the container closed. If an article is to be removed from the container strip 32 is torn off, hinge 29 will snap open the container and the article can be easily removed. In order to facilitate the opening of cover film 26 weakened lines or a thread can be provided.

Figure 14:
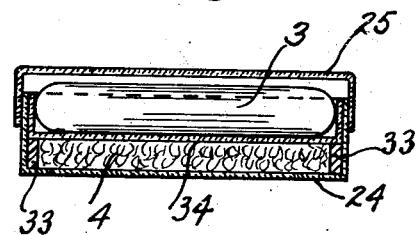
Fig. 14 shows a longitudinal section of still another embodiment of my invention.

In Fig. 14 a removable cover or tray 34 is provided which rests on supports 33 and separates lubricant 4 from article 3. This cover can be easily removed for use of lubricant and replaced after use thus permitting a repeated use of the lubricant.

My invention is not limited to the embodiments shown, but various changes and alterations may be made without departing from the scope of my invention.

What I claim as new and desire to be secured by Letters Patent is as follows:

1. A combination of a container comprising a top part and a bottom part, at least one surgical device of the class described placed in either of said parts, a lubricant for making the outer surface of said surgical device slippery provided in said other part, a partition wall for separating said surgical device from said lubricant and means for opening said partition wall imbedded in said wall.

2. A combination of a container comprising a top part and a bottom part, a lubricant adapted to make the outer surface of a surgical device of the class described slippery provided in the bottom part of said container, a cover for covering said lubricant, means for opening said cover imbedded in said cover and at least one surgical device of the class described placed on said cover.

3. A container comprising a top part and a bottom part, a surgical device of the class described, placed in either of said parts, a lubricant for making the outer surface of said surgical device slippery provided in said other part, a cover for covering said lubricant fastened to said part in which said lubricant is placed and means embedded in said cover for removing said cover, said means being arranged substantially following the configuration of said cover.

4. A container comprising a top part and a bottom part having a substantially circular cross-section, a surgical device of the class described placed in either of said parts, a lubricant for making the outer surface of said surgical device slippery provided in said other part, a substantially circular cover for covering said lubricant fastened to said part in which said lubricant is placed, at least two weakened lines provided in said cover, said weakened lines being arranged close to and following substantially the circumference of said cover, a tongue fastened to the covered area enclosed between said two weakened lines for tearing open said cover along said weakened lines.

ALFRED MENDEL.